(12) United States Patent
Orofino, II

(10) Patent No.: US 7,834,876 B2
(45) Date of Patent: *Nov. 16, 2010

(54) PROVIDING GRAPHIC GENERATING CAPABILITIES FOR A MODEL BASED DEVELOPMENT PROCESS

(75) Inventor: Donald Paul Orofino, II, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 1103 days.

This patent is subject to a terminal disclaimer.

(21) Appl. No.: 11/025,452

(22) Filed: Dec. 28, 2004

(65) Prior Publication Data

US 2006/0139372 A1 Jun. 29, 2006

(51) Int. Cl.
*G06T 11/20* (2006.01)

(52) U.S. Cl. .................. 345/441; 345/630; 345/643; 703/2

(58) Field of Classification Search ............... 345/441, 345/630, 643; 703/2
See application file for complete search history.

(56) References Cited

U.S. PATENT DOCUMENTS

| | | | | | |
|---|---|---|---|---|---|
| 4,490,782 | A | * | 12/1984 | Dixon et al. | 711/136 |
| 5,367,385 | A | * | 11/1994 | Yuan | 358/465 |
| 5,541,849 | A | * | 7/1996 | Rostoker et al. | 716/18 |
| 5,689,717 | A | * | 11/1997 | Pritt | 715/512 |
| 5,745,126 | A | * | 4/1998 | Jain et al. | 382/154 |
| 6,054,984 | A | * | 4/2000 | Alexander | 715/771 |
| 6,058,409 | A | * | 5/2000 | Kozaki et al. | 708/409 |
| 6,088,029 | A | * | 7/2000 | Guiberson et al. | 715/808 |
| 6,326,983 | B1 | * | 12/2001 | Venable et al. | 715/763 |
| 7,012,622 | B2 | * | 3/2006 | Wilkinson et al. | 345/629 |
| 7,187,780 | B2 | * | 3/2007 | Tian et al. | 382/100 |
| 7,353,146 | B2 | * | 4/2008 | Zarrinkoub et al. | 703/2 |
| 7,394,947 | B2 | * | 7/2008 | Li et al. | 382/305 |
| 7,424,410 | B2 | * | 9/2008 | Orofino et al. | 703/2 |
| 7,506,246 | B2 | * | 3/2009 | Hollander et al. | 715/230 |
| 7,509,244 | B1 | * | 3/2009 | Shakeri et al. | 703/7 |
| 2001/0030653 | A1 | * | 10/2001 | Bossut et al. | 345/619 |
| 2002/0030683 | A1 | * | 3/2002 | Alexander | 345/440.1 |
| 2002/0149602 | A1 | * | 10/2002 | Redpath et al. | 345/629 |
| 2003/0052896 | A1 | * | 3/2003 | Higgins et al. | 345/619 |
| 2003/0063105 | A1 | * | 4/2003 | Agnew | 345/660 |
| 2003/0065590 | A1 | * | 4/2003 | Haeberli | 705/27 |
| 2004/0210592 | A1 | * | 10/2004 | Ciolfi et al. | 707/101 |
| 2005/0033561 | A1 | * | 2/2005 | Orofino | 703/1 |

(Continued)

FOREIGN PATENT DOCUMENTS

EP 0656608 B1 6/1995

(Continued)

OTHER PUBLICATIONS

International Search Report for Application No. PCT/US2005/043954, dated Mar. 10, 2006.

(Continued)

*Primary Examiner*—Javid A Amini
(74) *Attorney, Agent, or Firm*—Lahive & Cockfield, LLP; Kevin J. Canning

(57) ABSTRACT

A method and system for providing a block for use in a block diagram in a graphical modeling environment which is capable of rendering a parameterized graphic annotation.

30 Claims, 7 Drawing Sheets

U.S. PATENT DOCUMENTS

| | | | |
|---|---|---|---|
| 2005/0138045 A1* | 6/2005 | Zarrinkoub et al. | 707/100 |
| 2005/0280661 A1* | 12/2005 | Kobayashi et al. | 345/633 |
| 2006/0129371 A1* | 6/2006 | Orofino et al. | 703/22 |
| 2007/0067761 A1* | 3/2007 | Ogilvie et al. | 717/146 |
| 2007/0157138 A1* | 7/2007 | Ciolfi et al. | 716/4 |
| 2008/0052425 A1* | 2/2008 | Orofino et al. | 710/52 |
| 2008/0065964 A1* | 3/2008 | Zarrinkoub et al. | 714/776 |

FOREIGN PATENT DOCUMENTS

EP 0712096 A2 5/1996

OTHER PUBLICATIONS

European Office Action for Application No. 05826253.6, dated Mar. 30, 2010.

* cited by examiner

PROVIDING GRAPHIC GENERATING CAPABILITIES FOR A MODEL BASED DEVELOPMENT PROCESS

FIELD OF THE INVENTION

The present invention relates to a graphical modeling environment for modeling a dynamic system. More particularly, the present invention relates to blocks capable of inserting graphics into image data, particularly video data streams.

BACKGROUND OF THE INVENTION

Many organizations are embracing the paradigm of Model Based Development in their production processes. "Model Based Development" refers to the practice of specifying, analyzing, and implementing systems using a common "model" consisting of a set of block diagrams and associated objects. System implementation typically consists of automatically generating code for portions of the model, particularly portions corresponding to the system's control algorithm.

Graphical modeling environments are programs that enable a user to construct and analyze a model of a process or system. Examples of graphical modeling tools include time-based block diagrams, such as Simulink from The MathWorks Inc., discrete event diagrams and reactive state machine diagrams, such as those found within Stateflow® also available from The MathWorks, Inc., data-flow diagrams, such as LabVIEW, available from National Instruments Corporation, and software diagrams and other graphical programming environments, such as Unified Modeling Language (UML) diagrams.

Some graphical modeling environments also enable simulation and analysis of models. Simulating a dynamic system in a graphical modeling environment is typically a two-step process. First, a user creates a graphical model, such as a block diagram, of the system to be simulated. A graphical model may be created using a graphical user interface, such as a graphical model editor. The graphical model depicts relationships between the systems inputs, states, parameters and outputs. After creation of the graphical model, the behavior of the dynamic system is simulated using the information entered into the graphical model. In this step, the graphical model is used to compute and trace the temporal evolution of the dynamic systems' outputs ("execute the graphical model"), and automatically produce either deployable software systems or descriptions of hardware systems that mimic the behavior of either the entire model or portions of the model (code generation).

Block diagrams are graphical entities having an "executable meaning" that are created within graphical modeling environments for modeling a dynamic system, and generally comprise one or more graphical objects. For example, a block diagram model of a dynamic system is represented schematically as a first collection of graphical objects, such as nodes, which are interconnected by another set of graphical objects, generally illustrated as lines, which represent logical connections between the first collection of graphical objects. In most block diagramming paradigms, the nodes are referred to as "blocks" and drawn using some form of geometric object (e.g., circle, rectangle, etc.). The line segments are often referred to as "signals". Signals correspond to the time-varying quantities represented by each line connection and are assumed to have values at each time instant. Each node may represent an elemental dynamic system, and the relationships between signals and state variables are defined by sets of equations represented by the nodes. Inherent in the definition of the relationship between the signals and the state variables is the notion of parameters, which are the coefficients of the equations. These equations define a relationship between the input signals, output signals, state, and time, so that each line represents the input and/or output of an associated elemental dynamic system. A line emanating at one node and terminating at another signifies that the output of the first node is an input to the second node. Each distinct input or output on a node is referred to as a port. The source node of a signal writes to the signal at a given time instant when its system equations are solved. The destination node of this signal read from the signal when their system equations are being solved. Those skilled in the art will recognize that the term "nodes" does not refer exclusively to elemental dynamic systems but may also include other modeling elements that aid in readability and modularity of block diagrams.

It is worth noting that block diagrams are not exclusively used for representing time-based dynamic systems but also for other models of computation. For example, in Stateflow®, flow charts are block diagrams used to capture behavior of reactive systems and process flow. Data flow blocks are block diagrams that describe a graphical programming paradigm where the availability of data is used to initiate the execution of blocks, where a block represents an operation and a line represents execution dependency describing the direction of data flowing between blocks.

The functional attributes for a block may affect the dynamics of the model using this block. These attributes are specified for the block as a whole and the input and output ports of the block. Examples of block attributes include block sample times and restrictive flags. Block sample times specify if the block corresponds to an elemental, continuous, discrete, or hybrid dynamic system. If the block is an elemental discrete-time system, then the attribute specifies the spacing between time instants at which the block response should be traced. A restrictive flag disallows the use of blocks in certain modeling contexts. For example, one may impose the restriction that there may only be one instance of given block in a model. Attributes of block ports specify properties of the data that is either available or produced at that port. Block port attributes include dimensions, datatypes, sample rates, and direct feedthrough. Dimension attributes are individual dimensions of a multi-dimensional matrix that is used as a container for data elements. Datatype attributes are the datatype of each element of data in the data container. A complexity attribute is a flag to specify if each data element is real or complex. A sample rate attribute specifies how when the signal corresponding to an input or output port will be used.

The video data is provided as a sequence of images in time. Each time-sample of the image sequence is a video frame. The information contained in each video frame is defined over a two-dimensional spatial grid, whose elements are known as the picture elements or pixels. If the image is gray scale, a single scalar value is assigned to each pixel representing the brightness (intensity of the light) in that element. If the image is in color, a vector is assigned to each pixel containing information regarding brightness (luminance) or the color content (chrominance) or both in that element. A multidimensional array or multiple two-dimensional matrices may also be used to represent color images.

Color video data is often provided in a tri-stimulus model format. Examples of suitable tri-stimulus model formats include, but are not limited to, RGB, YUV, LAB, YIQ, and HSV. In a tri-stimulus format, three signals are provided, each representing a component of the tri-stimulus format. For example, in the RGB color coordinate system an ordered triplet is used to represent the intensity of the red, green and blue light in each pixel. Thus, a first signal provides the red intensity data, a second signal provides green intensity data, and a third signal provides blue intensity data. Other examples will be apparent to one skilled in the art given the benefit of this disclosure.

In some instances, particularly in embedded systems, a user may wish to insert or overlay graphics on image data being handled by a system. For example, in a digital camera, it is useful to insert or overlay static or dynamic graphic elements indicating the status of the camera on the image being viewed, such as cross-hairs, power indicator, light level indicator, or bounding box indicating area of interest. Currently there is no simple way of providing such capabilities when creating a system in a graphical modeling environment.

As used herein, the term image data refers to data handled by a system that represents visual images. Video data is a type of image data that represents video images, such as those provided by a video camera. The terms graphics or graphic elements are used herein in reference to image data that is generated or synthesized locally in the modeled system for addition to provided image data such as video data.

SUMMARY OF THE INVENTION

The present invention provides a block for a block diagram model that is capable of inserting or overlaying a parameterized graphic annotation into image data received by the block.

In accordance with a first aspect, in a graphical programming environment, a method comprises providing a graphic block for rendering parameterized graphic annotations; and rendering a parameterized graphic annotation.

In accordance with another aspect, in a block diagram environment, a method comprises providing an image source for providing image data; and providing a graphic block in communication with the image source for overwriting selected pixels in image data received from the image source to add a parameterized graphic annotation to the image data.

In accordance with another aspect, in a graphical modeling environment, a method comprises providing a block diagram having a graphic block capable of adding a parameterized graphic annotation image data, and passing image data through the graphic block so as to add a parameterized graphic annotation to the image data.

In accordance with another aspect, in a graphical modeling environment, a method comprises providing a block diagram, modeling an embedded system, having a graphic block capable of adding a parameterized graphic annotation to image data; and generating code from block diagram for an embedded system.

In accordance with another aspect, in a graphical modeling environment, a graphic block, for adding a parameterized graphic annotation to image data, comprises at least one input port for receiving image data, at least one output port for outputting a combined signal comprising the image data and a parameterized graphic annotation, and functionality for combining the image data received on the input port with a parameterized graphic annotation to produce a combined signal for output on the output port.

In accordance with another aspect, a medium for use with an electronic device holding instructions executable by the electronic device for performing a method, comprises the steps of providing an image source for providing image data, and providing a graphic block in communication with the image source for overwriting selected pixels in image data received from the image source to add a parameterized graphic annotation to the image data.

In accordance with another aspect, a system for generating and displaying a graphical modeling application, comprises user-operable input means for inputting data to the graphical modeling application; a display device for displaying a graphical model; and an electronic device including memory for storing computer program instructions and data, and a processor for executing the stored computer program instructions, the computer program instructions including instructions for providing an image source for providing image data; and providing a graphic block in communication with the image source for overwriting selected pixels in image data received from the image source to add a parameterized graphic annotation to the image data.

In accordance with another aspect, a system for generating and displaying a graphical modeling application, comprises a distribution server for providing to a client device, a block for overwriting pixels in image data to add a parameterized graphic annotation to the image data; and a client device in communication with the distribution server.

In accordance with another aspect, in a network having a server, executing a graphical modeling environment, and a client device in communication with the server, a method comprises the steps of providing, at the server, a block diagram model of a dynamic system; and receiving, at the server from the client device, a selection of a block, in the block diagram model, for overwriting selected pixels in image data to add a parameterized graphic annotation to the image data.

DETAILED DESCRIPTION OF AN ILLUSTRATIVE EMBODIMENT

An illustrative embodiment of the present invention relates to generating and providing dynamic state information for a block in a communication system model. The present invention will be described relative to illustrative embodiments. Those skilled in the art will appreciate that the present invention may be implemented in a number of different applications and embodiments and is not specifically limited in its application to the particular embodiments depicted herein.

Figure 1A:
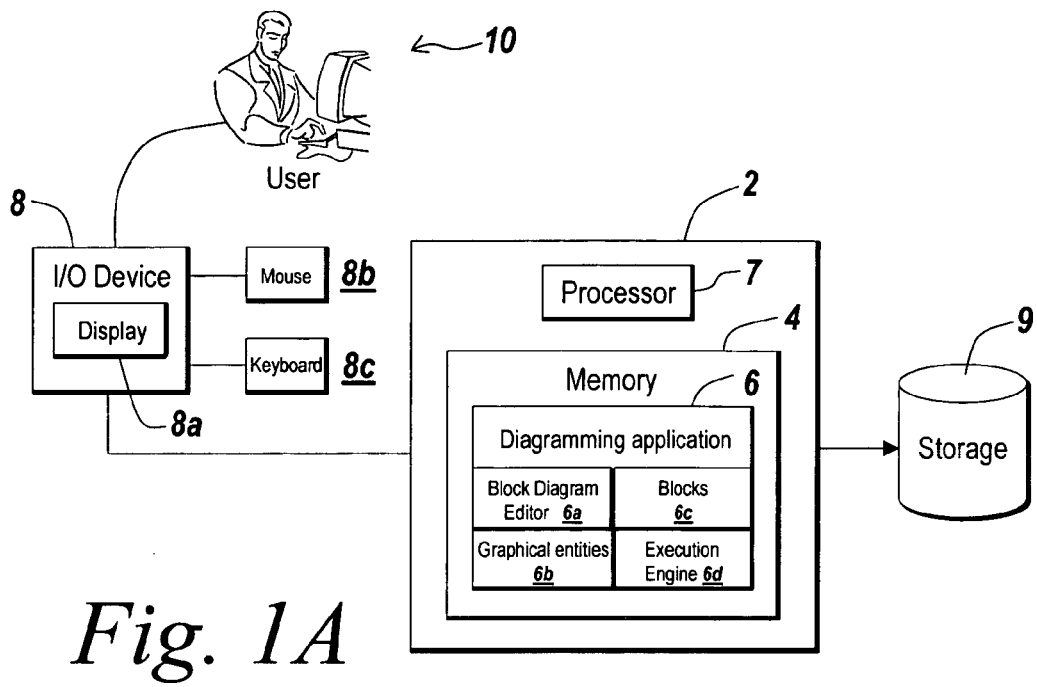
FIG. 1A illustrates an environment suitable for practicing an illustrative embodiment of the present invention.

FIG. 1A depicts an environment suitable for practicing an illustrative embodiment of the present invention. An electronic device 2 includes memory 4, on which software according to one embodiment of the present invention is stored, a processor (CPU) 7 for executing software stored in the memory, and other programs for controlling system hardware. Typically, the interaction of a human user 10 with the electronic device 2 occurs through an input/output (I/O) device 8, such as a user interface. The I/O device 8 may include a display device 8a (such as a monitor) and an input device (such as a mouse 8b and a keyboard 8c and other suitable conventional I/O peripherals).

For example, the memory 4 holds a diagramming application 6 capable of creating and simulating electronic versions of system diagrams, such as block diagrams, state diagrams, signal diagrams, flow chart diagrams, sequence diagrams, UML diagrams, dataflow diagrams, circuit diagrams, ladder logic diagrams, kinematic element diagrams, or other models, which may be displayed to a user 10 via the display device 8a. In the illustrative embodiment, the diagramming application 6 comprises a block diagram environment, such as Simulink® or another suitable other graphical modeling environment. As used herein, the terms "block diagram environment" and "graphical modeling environment" refer to a graphical application where a model is translated into executable instructions. Examples of suitable diagramming applications include, but are not limited to MATLAB with Simulink, from the MathWorks, LabVIEW, DasyLab and DiaDem from National Instruments Corporation, VEE from Agilent, SoftWIRE from Measurement Computing, VisSim from Visual Solutions, SystemVIEW from Elanix, WiT from Coreco, Vision Program Manager from PPT Vision, Khoros from Khoral Research, Halcon from MVTec Software, and numerous others. The memory 4 may comprise any suitable installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory may comprise other types of memory as well, or combinations thereof.

In an alternate embodiment, the electronic device 2 is also interfaced with a network, such as the Internet. Those skilled in the art will recognize that the diagrams used by the diagramming application 6 may be stored either locally on the electronic device 2 or at a remote location 9 interfaced with the electronic device over a network. Similarly, the diagramming application 6 may be stored on a networked server or a remote peer.

The diagramming application 6 of an illustrative embodiment of the invention includes a number of generic components. Although the discussion contained herein focuses on Simulink, from The MathWorks, Inc. of, Natick Mass., those skilled in the art will recognize that the invention is applicable to other software applications. The generic components of the illustrative diagramming program 6 include a block diagram editor 6a for graphically specifying models of dynamic systems. The block diagram editor 6a allows users to perform such actions as construct, edit, display, annotate, save, and print out a graphical model, such as a block diagram, that visually and pictorially represents a dynamic system. The illustrative diagramming application 6 also includes graphical entities 6b, such as signal lines and buses that represent how data is communicated between functional and non-functional units, and blocks 6c. As noted above, blocks are the fundamental mathematical elements of a classic block diagram model. A block diagram execution engine 6d, also implemented in the application, is used to process a graphical model to produce simulation results or to convert the graphical model to executable code. For a block diagram graphical model, the execution engine 6d translates a block diagram to executable entities following the layout of the block diagram as provided by the user. The executable entities are compiled and executed on an electronic device, such as a computer, to implement the functionality specified by the model. Typically, the code generation preserves a model hierarchy in a call graph of the generated code. For instance, each subsystem of a model in a block diagram environment can map to a user specified function and the generated code. Real-Time Workshop from the MathWorks, Inc. of Natick, Mass. is an example of a suitable execution engine 6d for generating code.

In the illustrative embodiment, the diagramming program 6 is implemented as a companion program to a technical computing program 11, such as MATLAB, also available from the MathWorks, Inc.

Figure 1B:
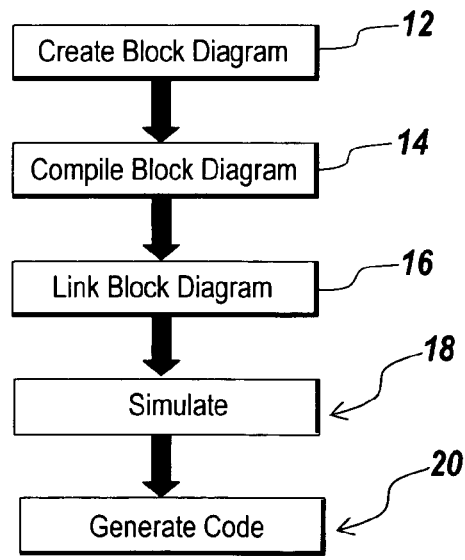
FIG. 1B is a flow chart illustrating the steps involved in simulating a dynamic system using the environment shown in FIG. 1A.

FIG. 1B is a flow chart diagramming the steps involved in simulating a dynamic system according to an illustrative embodiment of the invention. In step 12, a user creates a block diagram model representing a dynamic system. Once a block diagram model, or other graphical model, has been constructed using the editor 6a in step 12, the execution engine 6d simulates the model by solving equations defined by the model to trace the system outputs as a function of time, in steps 14-18. The solution of the model, which may be referred to as model execution, is carried out over a user-specified time span for a set of user-specified inputs. After creating the block diagram model in step 12, the execution engine 6d compiles the block diagram in step 14. Then, in step 16, the execution engine links the block diagram in to produce an "in-memory executable" version of the model. In step 18, the execution engine uses the "in-memory executable" version of the model to generate code and/or simulate a block diagram model by executing the model in step 24 or 20, or linearizing a block diagram model in step 30, as described in detail below.

The block diagram editor 6a is the user interface component that allows a user to create and modify a block diagram model representing a dynamic system, in step 12. The blocks in the electronic block diagram may model the behavior of specialized mechanical, circuit or software components, such as motors, servo-valves, power plants, blocks, tires, modems, receivers, and other dynamic components. The block diagram editor 6a also allows a user to create and store data relating to graphical entities 6b. In Simulink®, a textual interface with a set of commands allows interaction with the graphical editor. Using this textual interface, users may write special scripts that perform automatic editing operations on the block diagram. A user generally interacts with a set of windows that act as canvases for the model. There is generally more than one window for a model because models may be partitioned into multiple hierarchical levels through the use of subsystems.

A suite of user interface tools within the block diagram editor 6a allows users to draft a block diagram model on the corresponding windows. For example, in Simulink® the user interface tools include a block palette, a wiring line connection tool, an annotation tool, a formatting tool, an attribute editing tool, a save/load tool and a publishing tool. The block palette is a library of all the pre-defined blocks available to the user for building the block diagram. Individual users may be able to customize this palette to: (a) reorganize blocks in some custom format, (b) delete blocks they do not use, and (c) add custom blocks they have designed. The palette allows blocks to be dragged through some human-machine interface (such as a mouse or keyboard) from the palette on to the window (i.e., model canvas). The graphical version of the block that is rendered on the canvas is called the icon for the block. There may be different embodiments for the block palette including a tree-based browser view of all of the blocks.

Figure 2:
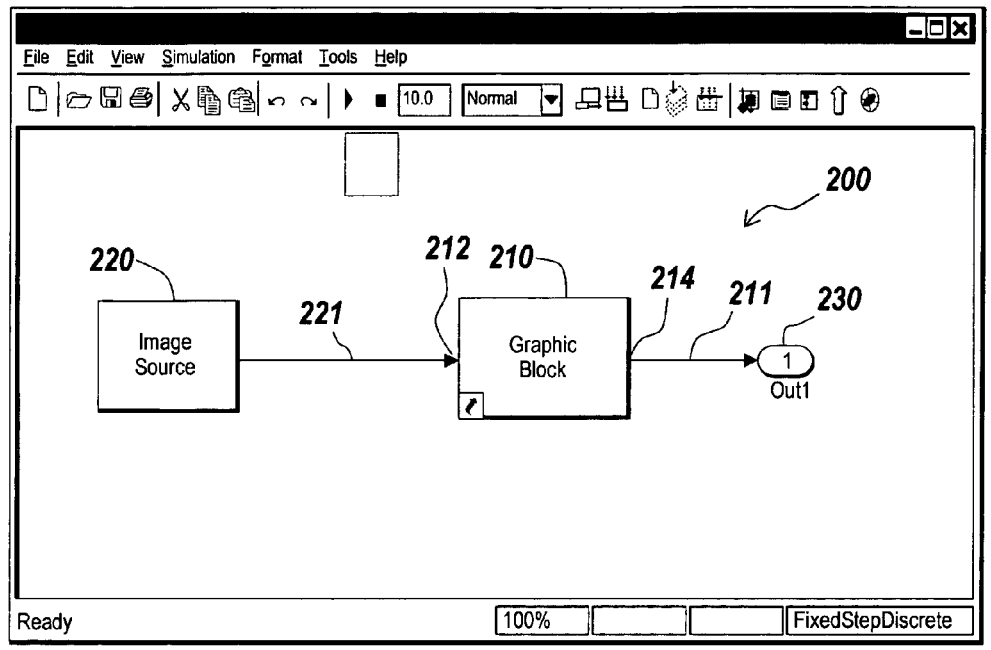
FIG. 2 is an example of a block diagram of a dynamic system in a graphical modeling environment.

A block diagram model of a dynamic system, created during step 12, is generally represented schematically as a collection of interconnected graphical objects, such as blocks, ports and lines, which represent signals. FIG. 2 illustrates an example of a block diagram 200 created using the diagramming application 6. Each block in the block diagram 200 represents an elemental dynamic system. Each signal, denoted by lines connecting the blocks, represents the input and/or output of an elemental dynamic system. The illustrative block diagram 200 includes a subsystem block 210, a source block 220 and a destination block 230. A line emanating at one block and terminating at another signifies that the output of the first block is an input to the second block. Ports, such as input port 212 and output port 214 of the subsystem block 210, refer to a distinct inputs or outputs on a block. Signals correspond to the time-varying quantities represented by each line connection and are assumed to have values at each time instant. The source block 220 for a signal 221 writes to the signal at a given time instant when its system equations are solved. In the illustrative embodiment, the source block 220 is an image source. As shown, the signal 221 from the source block passes to the subsystem 210, which is a graphic block. The signal 211 outputted from the subsystem passes to the destination block 230. The destination block 230 for a signal 211 reads from the signal 211 when the system equation is being solved. As shown, the signal 211 represents the output of the subsystem 210. One skilled in the art will recognize that the block diagram 200 is merely illustrative of a typical application and is not intended to limit the present invention in any way.

Figure 2A:
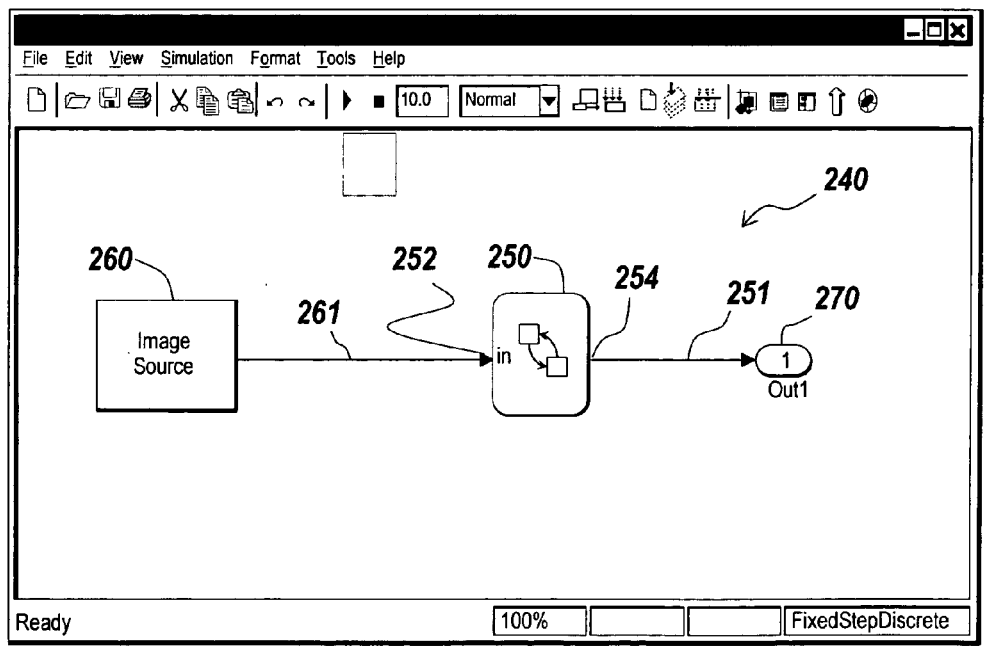
FIG. 2A is an example of a Stateflow® block diagram of a system in a graphical modeling environment.

FIG. 2A illustrates an example of a Stateflow® block diagram 240 created using the diagramming application 6. Each block in the Stateflow® block diagram 240 represents an elemental dynamic system. The flow of data, denoted by lines connecting the blocks, represents the input and/or output of the system. The illustrative block diagram 240 includes a Stateflow® block 250, a source block 260 and a destination block 270. A line emanating at one block and terminating at another signifies that the output of the first block is an input to the second block. Ports, such as input port 252 and output port 254 of the Stateflow® block 250, refer to a distinct inputs or outputs on a block. In the illustrative embodiment, the source block 260 is an image source. As shown, the data 261 from the source block passes to the Stateflow® block 250, which is a graphic block. The data 251 outputted from the Stateflow® block 250 passes to the destination block 270. One skilled in the art will recognize that the block diagram 240 is merely illustrative of a typical application and is not intended to limit the present invention in any way.

Once a block diagram model, or other graphical model, has been constructed using the editor 6a in step 12, the execution engine 6d simulates the model by solving equations defined by the model to trace the system outputs as a function of time, in steps 14-18. The solution of the model, which may be referred to as model execution, is carried out over a user-specified time span for a set of user-specified inputs.

The compile stage in step 14 marks the start of model execution and involves preparing data structures and evaluating parameters, configuring and propagating block characteristics, determining block connectivity, and performing block reduction and block insertion. The compile stage involves checking the integrity and validity of the block interconnections in the block diagram. In this stage, the engine 6d also sorts the blocks in the block diagram into hierarchical lists that are used when creating the block method execution lists. The preparation of data structures and the evaluation of parameters create and initialize basic data-structures needed in the compile stage. For each of the blocks, a method forces the block to evaluate all of its parameters. This method is called for all blocks in the block diagram. If there are any unresolved parameters, execution errors are thrown at this point.

The compilation step also determines actual block connectivity. Virtual blocks play no semantic role in the execution of a block diagram. During compilation, the virtual blocks and signals, such as virtual bus signals, in the block diagram are optimized away (removed) and the remaining non-virtual blocks are reconnected to each other appropriately. This compiled version of the block diagram with actual block connections is used from this point forward in the execution process.

In the link stage, in step 16, the execution engine 6d uses the result of the compilation stage to allocate memory needed for the execution of the various components of the block diagram. The linking stage also produces block method execution lists, which are used by the simulation or linearization of the block diagram. Included within the link stage is the initialization of the model, which consists of evaluating "setup" methods (e.g. block start, initialize, enable, and constant output methods). The block method execution lists are generated because the simulation and/or linearization of a model must execute block methods by type (not by block) when they have a sample hit.

The compiled and linked version of the block diagram may be directly utilized to execute the model over the desired time-span, in step 18. In step 20, the execution engine may choose to translate the block diagram model (or portions of it) into either software modules or hardware descriptions (broadly termed code). The code may be instructions in a high-level software language such as C, C++, Ada, etc., hardware descriptions of the block diagram portions in a language such as HDL, or custom code formats suitable for interpretation in some third-party software. Alternatively, the code may be instructions suitable for a hardware platform such as a microprocessor, microcontroller, or digital signal processor, etc., a platform independent assembly that can be re-targeted to other environments, or just-in-time code (instructions) that corresponds to sections of the block diagram for accelerated performance.

Upon reaching the simulation stage 18, the execution engine 6d uses a simulation loop to execute block methods in a pre-defined ordering upon a sample hit to produce the system responses they change with time.

According to an illustrative embodiment of the invention, the diagramming application 6 allows the use of selected blocks that are capable of rendering a parameterized graphic annotation. An example of such a block is the subsystem block 210, the graphic block, as shown in FIG. 2. Here an image source 220 and a graphic block 210 in communication with the image source are provided. The image source block 220 provides image data. The graphic block 210 is capable of overwriting selected pixels in image data received from the image source 220 to add a parameterized graphic annotation to the image data.

The image source 220 models devices such as cameras that are capable of producing image data. For example the image device may be a video camera that produces a video signal. The image source 220 may also be a storage device or media containing image data. Examples of such storage devices or media include but are not limited to hard drives, digital video recorders, CD-ROMS, and DVDs. Other embodiments will be apparent to one skilled in the art given the benefit of this disclosure.

The image data may be static or active. In certain embodiments it is a video signal. Preferably, the signal is provided in matrix form, for example a two dimensional matrix. Video may be provided in this manner or in higher dimensionality in any number of conventional formats such as RGB, HSV, and YUV. Video and image data may be converted for use in other applications, such as color printing, by converting to relevant color spaces such as CMYK. Other examples will be apparent to one skilled in the art given the benefit of this disclosure.

Figure 3A:
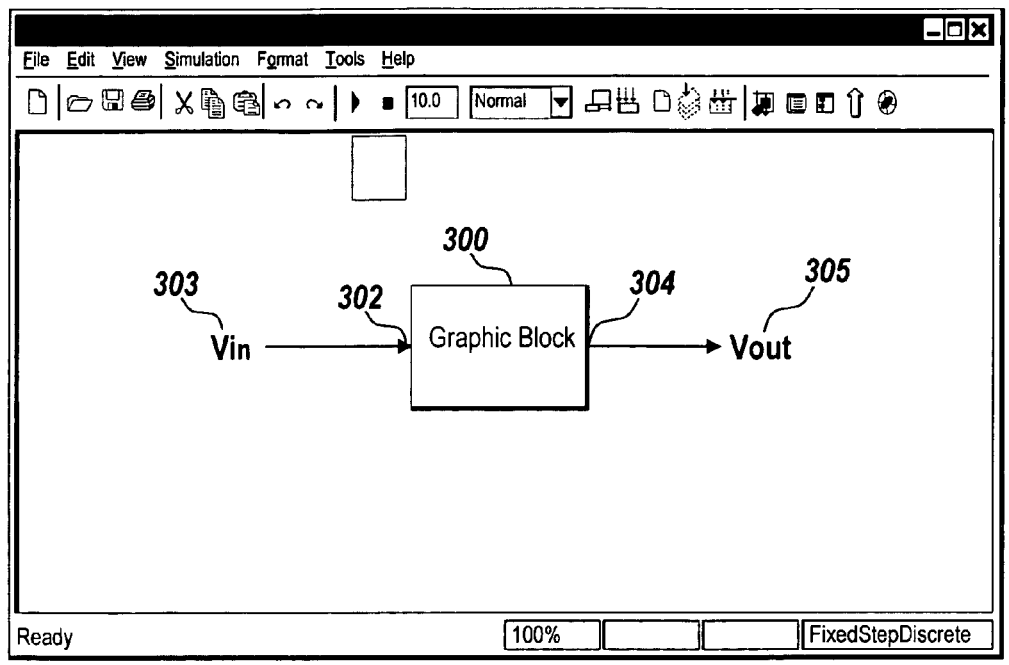
FIG. 3A is an example of one embodiment of the graphic block of the present invention.

One embodiment of a graphic block is illustrated in FIG. 3A. The graphic block 300 has an output port 304 for outputting image data having a parameterized graphic annotation 305. The graphic block 300 represents the functionality that renders the graphically parameterized graphic annotation. The rendering of a parameterized graphic annotation may be performed by generating image data having the graphic annotation or, in some embodiments, by overwriting selected pixels in provided image data 303 received on an input port 302.

Figure 3B:
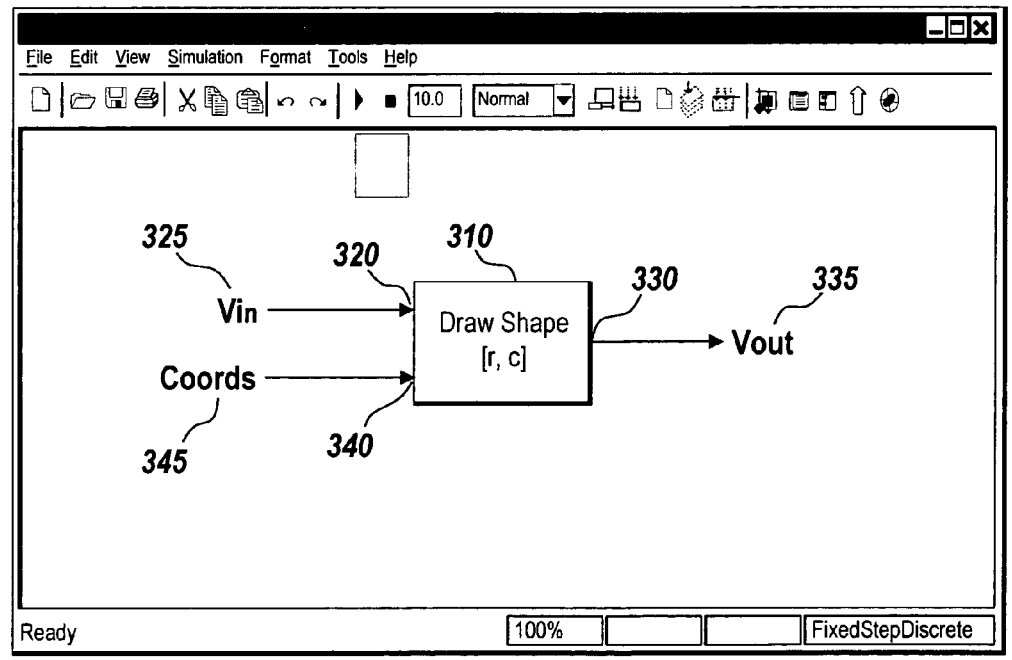
FIG. 3B is an example of another embodiment of the graphic block of the present invention configured to receive multiple parameters.

Another embodiment of a graphic block is illustrated in FIG. 3B. The graphic block 310 has at least one input port 320 and at least one output port 330. The input port 320 is for receiving image data, shown here as a video signal ($V_{in}$) 325. The output port 330 is for outputting image data, shown here as a video signal ($V_{out}$) 335, with an added parameterized graphic annotation. Here, The graphic block 320 represents the functionality that allows a rendered parameterized graphic annotation to be added to the received image data (in this case, a video signal ($V_{in}$) 325) and output image data with an added parameterized graphic annotation ($V_{out}$) 335. This may be done by overwriting selected pixels in the received video signal ($V_{in}$) to add a parameterized graphic annotation to the outputted video signal ($V_{out}$) 335. As used herein, the term overwriting refers to the altering of an element of a matrix. Here the elements are pixels in a pixel matrix. There are many ways of overwriting selected pixels. For example, computations or transforms could be performed on the image data such as transparency or alpha blending. Pixel data in a matrix may also be simply replaced with new data. Other techniques will be apparent to one skilled in the art given the benefit of this disclosure.

In certain embodiments, the graphic block 310 may have an additional input port 340 for receiving parameters 345 for the placement of the parameterized graphic annotation in the image data. For example, if the image data received is a pixel matrix, wherein each field in the matrix corresponds to a pixel in the image, the parameters provide information regarding which pixels need to be overwritten to add the parameterized graphic annotation to the image data. In one embodiment, wherein the parameterized graphic annotation being added is a rectangle, or bounding box, the parameters may be provided in the format $[R_1, C_1, R_2, C_2]_{Rec}$ wherein $R_1$ and $C_1$ are the row and column in the image data pixel matrix of a first corner of a rectangle and $R_2$ and $C_2$ are the row and column of a second corner diametrically opposed to the first corner. Given these two corner points the graphic block is capable of generating a rectangle defined by the diametrically opposed corner points by over writing corresponding pixels in the image data.

Other parameter formats and shapes are also possible. In many cases the format of the parameters is determined by the shape and the amount of information necessary to define the shape. For example, the format for a graphic block generating a circle may be $[R, C, r]_{Cir}$ where R and C are the row and column placement of the center of the circle and r is the radius of the circle. In some embodiments, parameters for multiple shapes may be received on the input port 340. In some embodiments, where the graphic block is capable of generating multiple types of shapes, an identifier may also be provided, instructing the graphic block as to which type of shape is to be rendered. Other possible formats for various shapes will be apparent to one skilled in the art given the benefit of this disclosure.

Figure 3C:
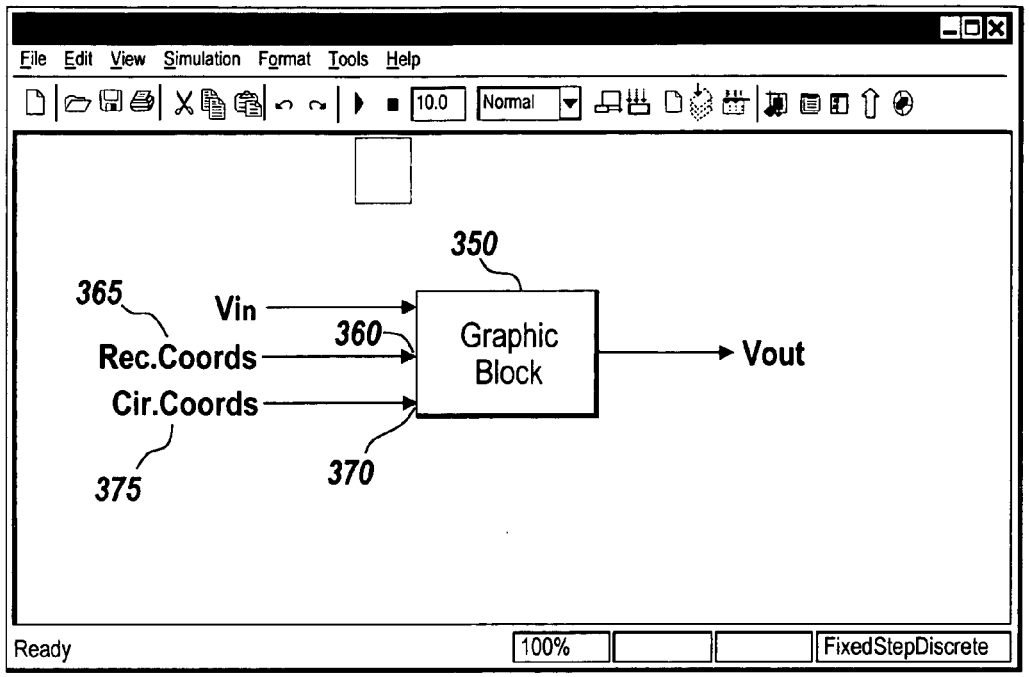
FIG. 3C is an example of another embodiment of the graphic block of the present invention configured to receive an imported graphic.

In other embodiments the graphic block may have multiple input ports for receiving parameters. Each port may be for receiving a specific parameter. For example, a port for receiving row information and a port for receiving column information. The separate ports may also be used for receiving parameters for different shapes. For example, the graphic block may add multiple parameterized graphic annotations, and have separate input ports for receiving parameters for each of the multiple shapes to be added to the image data. The multiple shapes may be the same type of shape or different types of shapes. For example, a graphic block 350, as illustrated in FIG. 3C may render both rectangles and circles and have separate input ports for receiving the corresponding parameters. One port 360 for receiving parameters 365 for a rectangle and one port 370 for receiving parameters 375 for a circle. Other possible configurations will be apparent to one skilled in the art given the benefit of this disclosure.

Figure 3D:
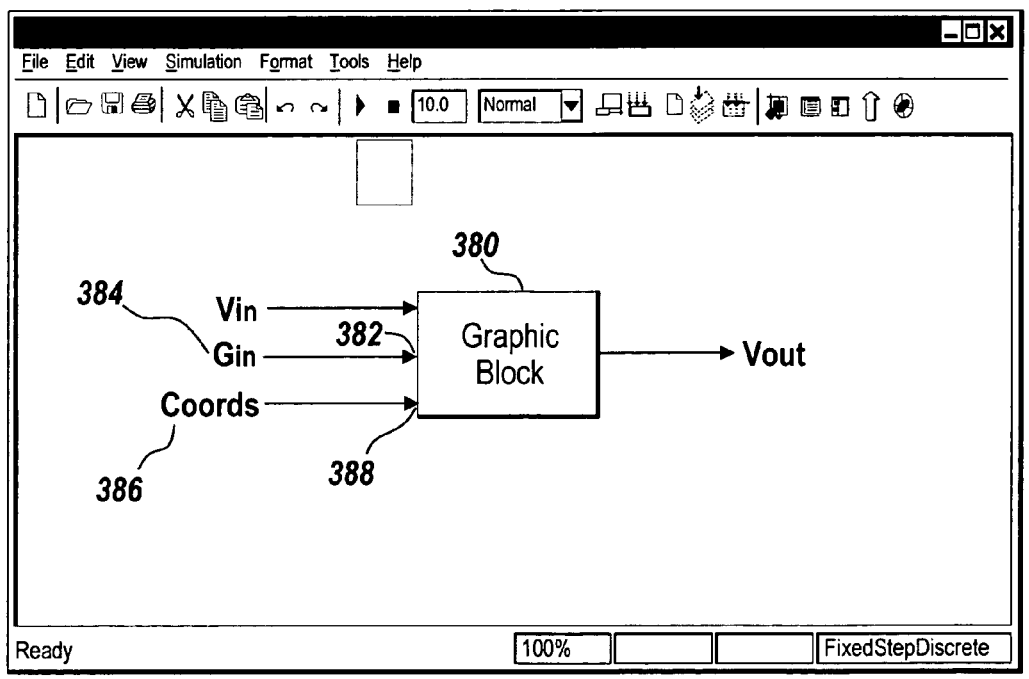
FIG. 3D is an example of another embodiment of the graphic block of the present invention in which the graphic block is provided with a graphic to be added to the image data.

In another embodiment, as illustrated in FIG. 3D, the graphic block 380 may be provided with the graphic ($G_{IN}$) 384 to be added to the image data. In this case, the graphic block 380 may have an additional port 382 for receiving a graphic 384 to be imported. The graphic block 380 then overwrites the necessary pixels in the received image data pixel matrix to add the imported graphic 384 to the image data. Parameters 386 for the placement of the imported graphic 384 may also be provide via a port 388 in a manner such as disclosed and discussed above.

The parameterized graphic annotation is added to the image data by overwriting selected pixels in the image data received by the block diagram. The parameterized graphic annotation may be a line, shape, icon, text, or any combination thereof. The graphic annotation is parameterized in that the graphic is described by the values of its parameters. The number of parameters is generally less than the total number of pixels rendered in the graphic annotation. For example, to render a circle graphic annotation, the minimum parameter set might describe the center of the circle (one parameter for each of the x and y coordinates) and a parameter for the circle radius, providing a set of 3 parameters. In another example, the circle may have additional parameters indicating the color to fill the circle, the color of the circular boundary around the perimeter of the circle, and perhaps a parameter controlling the transparency of the rendering, for a total of 6 parameters describing the graphic annotation. In another example, to draw textual font or glyph-based graphic annotations, a parameter indicating the selection of glyph (such as a letter of the alphabet or a numeral) is utilized; additional parameters describing font size, weight, position, color, and other attributes are presented as a set of parameters for rendering the graphic annotation from a block in a block diagram. Other types of graphic annotations can have different sets of parameterizations.

Examples of shapes include, but are not limited to rectangles, circles, and polygons. In certain embodiments the graphic annotation is a bounding box. Graphical effects like 3-D perspective texture mapping and image warping may also be implemented. Other shapes and icons will be apparent to one skilled in the art given the benefit of this disclosure.

The parameterized graphic annotation may be generated by the graphic block or provided by another source and imported into the graphic block for addition to the image data received by the graphic block.

The parameterized graphic annotation may be static relative to the image data it is being added to. For example, the image data might be a video signal that changes over time while the parameterized graphic annotation does not. The parameterized graphic annotation remains in the same place, the same shape and the same size over time. Alternatively, the parameterized graphic annotation may be dynamic and change position, size, shape, or any combination thereof over time.

Figure 4A:
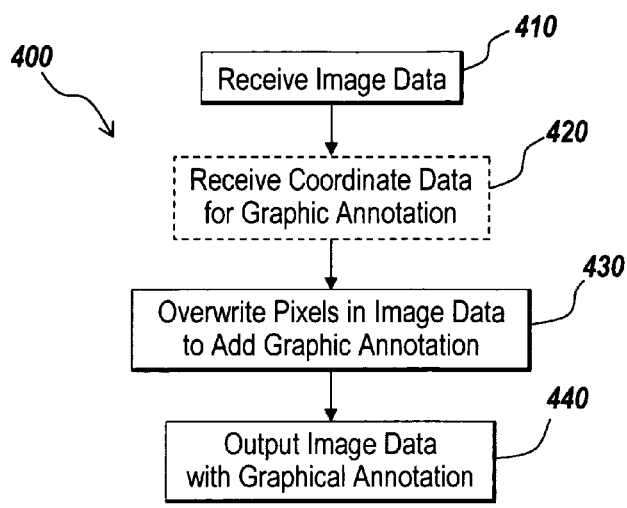
FIG. 4A is an exemplary flowchart of the operation of one embodiment of the graphic block of the present invention.
Figure 4B:
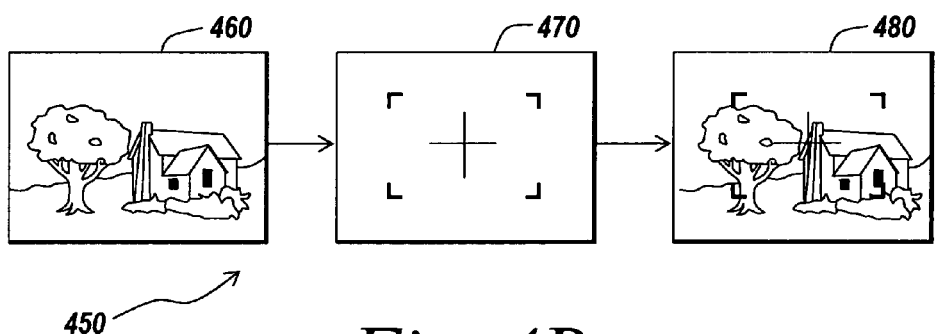
FIG. 4B is an exemplary visual depiction of the image data during the operation of the embodiment of the graphic block illustrated in FIG. 4A.

An exemplary flow chart 400 of a method of operation for the graphic block is illustrated in FIG. 4A with a corresponding visual depiction 450 of the image data shown in FIG. 4B. As depicted in FIG. 4A, image data may be received by the graphic block, step 410. Then there is the optional step, for some embodiments, of receiving parameters for the parameterized graphic annotation 420. In certain embodiments, this step may also include the importing of a graphic annotation. Then the parameterized graphic annotation is rendered, here this done by overwriting selected pixels to add the parameterized graphic annotation to the image data, step 430. The image data with the added parameterized graphic annotation is then outputted, step 440. In FIG. 4B, an example of the image data being received is depicted at 460. The image data is that of an outdoor scene. The parameterized graphic annotation to be added (a viewfinder graphic) to assist in aiming or framing a picture, is depicted at 470. The image data with the added parameterized graphic annotation are depicted at 480.

Figure 4C:
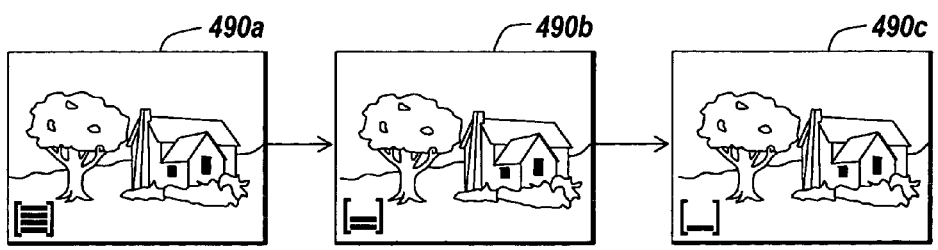
FIG. 4C is an exemplary visual depiction of the image data during the operation of the embodiment of the graphic block illustrated in FIG. 4A, depicting a dynamic graphic annotation.

An example of a dynamic parameterized graphic annotation is shown in FIG. 4C. Here, the graphic annotation is a power meter. The bars of the power meter change over time, as depicted in stages 490a through 490c, reflecting, for example, the power level of the camera.

Thus, in this manner image data, such as video, can be passed through the graphic block to add a parameterized graphic annotation, such as viewfinder or power meter, to the image data. It will be apparent to one skilled in the art, that any number of parameterized graphic annotations can be added to image data for any number of applications.

Figure 5A:
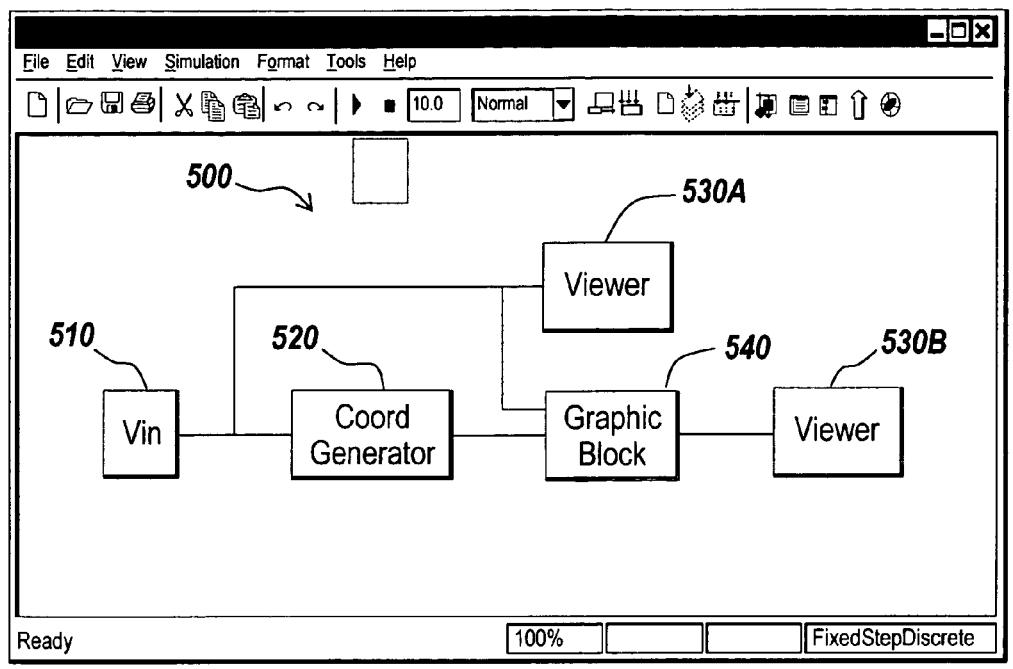
FIG. 5A is an example of a block diagram of a dynamic system in a graphical modeling environment.

An example of a block diagram 500 of a modeled system is illustrated in FIG. 5A. The block diagram 500 comprises an image data source 510, a parameter generator 520, a graphic block 540, and one or more viewers 530A, 530B. The image data source, as discussed above and shown in FIG. 2, provides image data to the parameter generator 520, viewer 530A, and graphic block 540. The parameter generator 520 represents functionality that can generate parameters for parameterized graphic annotations to be added to the image data. The viewers 530A represent a display that allows a user to view the image data without the added parameterized graphic annotation. The graphic block 540 receives the image data from the image data source 510 and parameters for a parameterized graphic annotation from the parameter generator 520. The graphic block 540 then add a parameterized graphic annotation to the image data as directed by the parameters. The combined signal of the image data and added parameterized graphic annotation outputted from the graphic block can then be viewed by a user via viewer 530B.

Figure 5B:
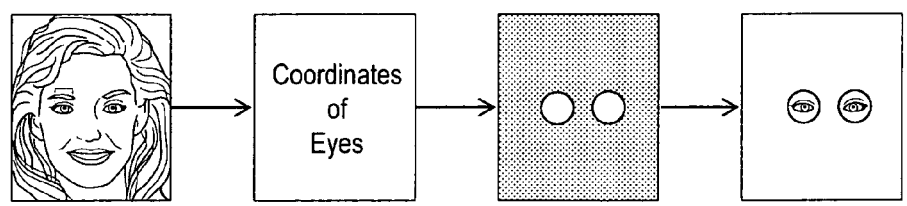
FIG. 5B is an exemplary visual depiction of the image data during the operation of one embodiment of the block diagram illustrated in FIG. 5A wherein it is performing a masking process.

One possible use for the system illustrated in FIG. 5A is as a masking system. For example, systems that scan or track eye movement require a considerable amount of computer computation and processing. The amount of computer computation and processing can be reduced by limiting the amount of image data needing to be processed. One way of accomplishing this involves masking or blocking out areas of the image data that don't require processing. In this example the image data source 510 is a camera that generates a video stream of a persons face. A visual depiction of this image data as it would be displayed by the viewer 530A can be seen at 550 in FIG. 5B. The video stream is then provided to parameter generator 520 which calculates the location of the eyes in the pixel matrix of the image data and generates parameters for circles with areas that encompass the eyes as shown at 555. The parameters are then provided to the graphic block 540 along with the video stream image data. The graphic block then renders a mask having circles encompassing the area where the eyes of the face in the videos stream would appear as shown at 560 of FIG. 5B. Thus when the mask is added to the video stream image data, the mask blocks out all the image data in the pixel matrix except for the location in the pixel matrix where the eyes of the face would be located. A visual depiction of this, as would be seen by a user at viewer 530B, is shown at 565 of FIG. 5B. With only the area of the eyes in the pixel matrix of the video stream needing to be processed, the total amount of processing and computation by the eye scanning or tracking functionality is reduced.

One particularly advantageous application of the graphic block is in embedded systems such as processors or field programmable gate arrays (FPGAs). Unlike typical graphics handling that can make use of many services available to a desktop or rely on the presence of graphic accelerators, embedded systems cannot make as many presumptions about available resources. Efficient handling of many data types including double and single-precision floating as well as integer and fixed point numerics is critical. Many embedded environments require the implementation of the algorithms to be exclusive of floating point. Such embedded systems have numerous uses in the automotive, aerospace, bio-pharmaceutical, consumer electronics, and surveillance fields.

Thus in certain embodiments the dynamic system being modeled by a block diagram having a graphic block, is an embedded system. Correspondingly, the code generated by the execution engine from the block diagram containing a graphic block is specifically designed for embedded systems. In some embodiments a graphical application program interface, such as Open GL ES, can be used. In certain embodiments, the code for embedded systems does not perform dynamic memory allocations. This is critical to ensuring stable and bounded operation in an embedded system.

Figure 6:
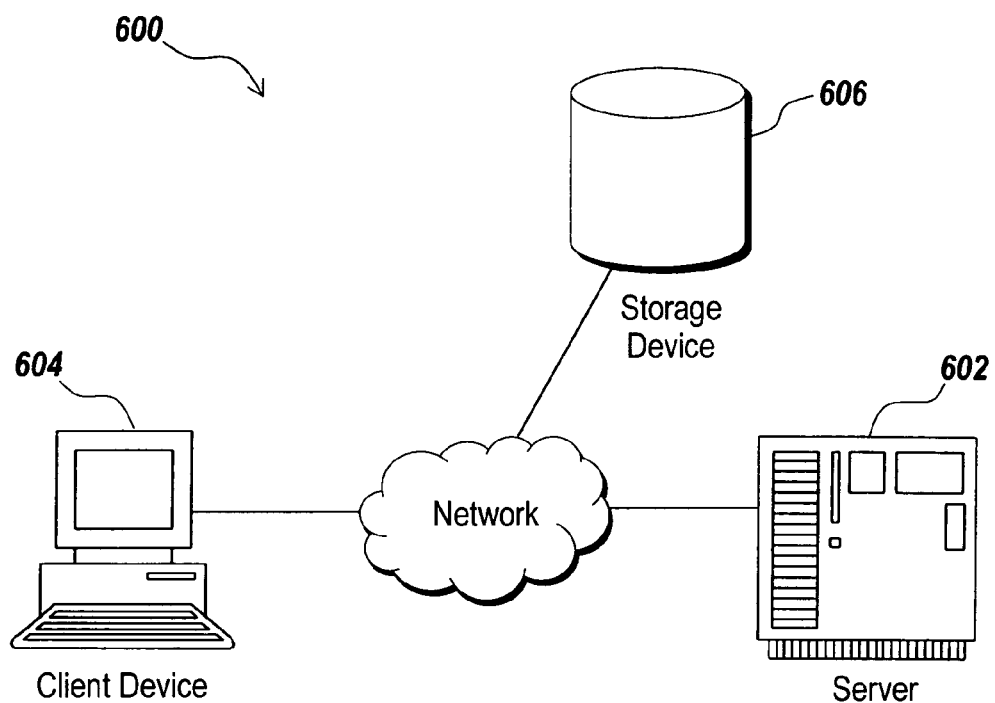
FIG. 6 illustrates a client-server environment suitable for practicing an illustrative embodiment of the present invention

The examples to this point have focused primarily on the system where the graphical modeling environment was on a local electronic device. The graphical modeling environment may of course also be implemented on a network 600, as illustrated in FIG. 6, having a server 602 and a client device 604. Other devices, such as a storage device 606, may also be connected to the network.

In one such embodiment a system for generating and displaying a graphical modeling application, comprises a distribution server for providing to a client device, a graphic block capable of overwriting selected pixels in image data to add a parameterized graphic annotation to the image data; and a client device in communication with the distribution server. Here the distribution server provides a client device, such as an electronic device discussed above, with a graphic block capable of overwriting selected pixels in image data to add a parameterized graphic annotation to the image data. This graphic block may be part of a block set available to the client on the server. The client may then use the graphic block, capable of overwriting selected pixels in image data to add a parameterized graphic annotation to the image data, in a block diagram for a dynamic system and pass image data through the graphic block so at to output image data incorporating a parameterized graphic annotation from the block. In certain embodiments, the client may also generate code from the graphic block for use in embedded systems.

In another embodiment, the server may execute the graphical modeling environment. A user may then interact with the graphical modeling interface on the server through the client device. In one example of such a system a server and client device are provided. The server is capable of executing a graphical modeling environment, wherein the graphical modeling environment provides a block diagram model of a dynamic system. The client device is in communication with the server over a network. A graphic block, of the block diagram of a dynamic model, capable of overwriting selected pixels in image data to add a parameterized graphic annotation to the image data, is selected at the server from the client device. The graphic block may then be provided with image data and output image data incorporating a parameterized graphic annotation. In some embodiments, parameters may also be provided to the graphic block. In certain embodiments, the server may also be used to generate code for use in and embedded system.

It will be understood by one skilled in the art that these network embodiments are exemplary and that the functionality may be divided up in any number of ways over a network.

The present invention has been described relative to illustrative embodiments. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

What is claimed is:

1. A computer-implemented method for rendering a parameterized graphic annotation using a computer programmed to perform the computer-implemented method, the computer having a processor, the method comprising:
   providing a block diagram modeling environment for creating and simulating an electronic version of a system diagram;
   providing an executable block diagram model that graphically represents a dynamic system in the block diagram modeling environment, the executable block diagram model being represented schematically in the block diagram modeling environment as a collection of graphical blocks interconnected by signals;
   generating a block for the block diagram model for annotating an image with a parameterized graphic annotation, the block when executed causing an image that is input into the block to be annotated with the parameterized graphical annotation, some or all of the parameterized graphical annotation being either input into the block or generated by the block; and
   incorporating the generated block into the block diagram model.

2. The method of claim 1 further comprising generating code from the block diagram modeling environment.

3. The method of claim 2, wherein the code is for use in an embedded system.

4. The method of claim 3, wherein the code is for use in a processor.

5. The method of claim 3, wherein the code is for use in a field programmable gate array.

6. The method of claim 3, wherein no dynamic memory is allocated.

7. The method of claim 2, wherein the code uses a graphical application programming interface.

8. The method of claim 1, wherein an embedded system is being modeled by the executable block diagram model.

9. The method of claim 1, wherein the parameterized graphic annotation is a geometric shape.

10. The method of claim 1, wherein the parameterized graphic annotation is user specified.

11. The method of claim 1, wherein the parameterized graphic annotation is static.

12. The method of claim 1, wherein parameterized graphic annotation is dynamic.

13. The method of claim 1, further comprising storing the output image data having the parameterized graphic annotation in a storage associated with the computer.

14. The method of claim 1, further comprising:
   Outputting the annotated graphical image from the block.

15. A computer-implemented method for rendering a graphic annotation using a computer having a processor, the method comprising:
   providing a block diagram modeling environment for creating and simulating an electronic version of a system diagram;
   providing an image source for providing image data;
   generating a block in an executable block diagram model that graphically represents a dynamic system in the block diagram modeling environment, the block being in communication with the image source for adding a graphic annotation to image data, the executable block diagram model being represented schematically in the block diagram modeling environment as a collection of graphical blocks interconnected by signals;
   incorporating the block into the executable block diagram model;
   receiving a first image as input to the block from the image source;
   overwriting, using the processor, selected pixels in the first image to add the graphic annotation to the image data with the block; and
   outputting a second image from the block, the second image having the parameterized graphic annotation.

16. The method of claim 15 further comprising outputting, from the component, overwritten image data having an added graphic annotation.

17. The method of claim 15, wherein overwriting selected pixels comprises performing an alpha blending operation.

18. The method of claim 15, further comprising displaying the image data with the graphic annotation on a display.

19. A computer-implemented method for rendering a graphic annotation using a computer having a processor, the method comprising:

providing a block diagram modeling environment for creating and simulating an electronic version of a system diagram;

providing an executable block diagram model that pictorially represents a dynamic system in the block diagram modeling environment, the executable block diagram model being represented schematically in the block diagram modeling environment as a collection of graphical blocks interconnected by signals;

generating a graphic block that, when executed, causes a graphical image that is input to the block to be annotated with a parameterized graphic annotation, some or all of the parameterized graphic annotation being either input to the block or generated by the block;

incorporating the graphic block into the executable block diagram model; and passing image data through the graphic block so as to add a parameterized graphic annotation to the image data.

20. The method of claim 19, further comprising providing parameters for the graphic annotation.

21. The method of claim 19, further comprising displaying the image data with the graphic annotation on a display.

22. A computer-implemented method for generating code for an embedded system using a computer having a processor, the method comprising:

providing a block diagram modeling environment for creating and simulating an electronic version of a system diagram;

providing an executable block diagram model in the block diagram modeling environment that pictorially represents the embedded system, the executable block diagram model being represented schematically in the block diagram modeling environment as a collection of graphical blocks interconnected by signals;

generating a graphic block that, when executed, causes a graphical image that is input into the block to be annotated with a graphic annotation, some or all of the graphic annotation being either input into the block or generated by the block;

incorporating the graphic block into the block diagram model; and generating code from the executable block diagram model for the embedded system.

23. A computer-readable medium storing computer-executable instructions that are executable by a computer, the instructions comprising one or more instructions for:

providing a block diagram modeling environment for creating and simulating an electronic version of a system diagram in a memory of the computer;

providing an executable block diagram model that pictorially represents a system in the block diagram modeling environment, the executable block diagram model being represented schematically in the block diagram modeling environment as a collection of graphical blocks interconnected by signals;

generating a block that, when executed, causes a graphical image that is input into the block to be annotated with a parameterized graphic annotation;

incorporating the block into the block diagram model;

receiving image data as input to the block; and outputting, from the block, image data having the parameterized graphic annotation.

24. A system for generating and displaying a block diagram modeling environment using a computer, the system comprising:

an input device for inputting data to the block diagram modeling application;

a display device for displaying an executable block diagram model; and a processor configured to:

provide the block diagram modeling environment, the block diagram modeling environment providing a simulatable block diagram model represented schematically in the block diagram modeling environment as a collection of graphical blocks interconnected by signals;

generate a graphic block in the executable block diagram modeling environment, the graphic block when executed causing a graphical image that is input to the block to be annotated with a parameterized graphic annotation, some or all of the parameterized graphic annotation being either input into the block or generated by the block; and render a parameterized graphic annotation.

25. A system for generating and displaying a graphical block diagram modeling environment, the system comprising:

a distribution server for providing to a client device a graphic block for rendering parameterized graphic annotations using a block diagram modeling environment, the graphic block for use in an executable block diagram model represented schematically in the block diagram modeling environment as a collection of graphical blocks interconnected by signals, the graphic block when executed causing a graphical image that is input into the graphic block to be annotated with a graphical annotation, some or all of the graphical annotation being either input into the block or generated by the block; and a client device in communication with the distribution server, the client device configured to receive the graphic block from the distribution server and place the graphic block in an executable block diagram model.

26. In a network having a server, executing a graphical modeling environment, and a client device in communication with the server, a method comprising:

providing, at the server, an executable block diagram model that pictorially represents a dynamic system, the executable block diagram model provided by a block diagram modeling application, the executable block diagram model being represented schematically in the block diagram modeling environment as a collection of graphical blocks interconnected by signals; and receiving, at the server from the client device, a selection of a block, in the block diagram model, for rendering parameterized graphic annotations, the block when executed causing a graphical image that is input into the block to be annotated with a graphical annotation, some or all of the graphical annotation being either input into the block or generated by the block.

27. The method of claim 26, further comprising providing image data to the block.

28. The method of claim 26, further comprising outputting, from the block, image data having a rendered parameterized graphic annotation.

29. The method of claim 28 further comprising generating code for an embedded system.

30. The method of claim 26, further comprising providing parameters to the block.

* * * * *